United States Patent [19]

Dunn et al.

[11] Patent Number: 5,790,406
[45] Date of Patent: Aug. 4, 1998

[54] HIERARCHICAL SYSTEM OF THE SIMPLE MODIFICATION OF PROCESS STEPS FOR A MANUFACTURING TOOL

[75] Inventors: John P. Dunn, Cold Spring; David A. Lewis, Carmel, both of N.Y.

[73] Assignee: International Business Machines Corporation, Armonk, N.Y.

[21] Appl. No.: 546,364

[22] Filed: Oct. 20, 1995

[51] Int. Cl.[6] .................. G06F 9/00; G06F 11/00
[52] U.S. Cl. .................. 364/474.11; 364/468.03; 364/468.09; 364/468.24
[58] Field of Search ............ 364/468.03, 468.04, 364/468.05, 468.09, 474.11, 474.24, 468.15, 468.24; 395/800

[56] References Cited

U.S. PATENT DOCUMENTS

| | | | |
|---|---|---|---|
| 4,901,225 | 2/1990 | Shiraishi | 395/388 |
| 5,111,388 | 5/1992 | Shiraishi | 395/800 |
| 5,146,404 | 9/1992 | Calloway et al. | 364/401 |
| 5,159,689 | 10/1992 | Shiraishi | 395/800 |
| 5,197,011 | 3/1993 | Biemans et al. | 364/132 |
| 5,210,686 | 5/1993 | Jernigan | 364/403 |
| 5,216,612 | 6/1993 | Cornett et al. | 364/401 |
| 5,280,614 | 1/1994 | Munrol et al. | 395/650 |
| 5,442,746 | 8/1995 | Barrett | 395/161 |

*Primary Examiner*—Paul P. Gordon
*Attorney, Agent, or Firm*—Daniel P. Morris

[57] ABSTRACT

A system and method for controlling an apparatus, in particular an apparatus for performing manufacturing operations on a work piece is described. The system uses a hierarchical series of levels of functional operations. The system has a highest level and a series of lower levels. There is a means for initiating an instruction in the highest level which results in executing of instructions in the series of lower levels until an instruction is executed to control the apparatus. A particular example consists of four levels all written as sample programming language files which are fully editable and modifiable by end users: A manufacturing operations consists of a cell or cluster of manufacturing the operations of which are controlled by the system of the invention which enables on-line tool diagnostics and simulations that can predict the effects of proposed process changes, thereby reducing the time normally required to make alterations to a process.

22 Claims, 4 Drawing Sheets

HIERARCHICAL SYSTEM OF THE SIMPLE MODIFICATION OF PROCESS STEPS FOR A MANUFACTURING TOOL

FIELD OF THE INVENTION

The invention is directed to a system and method for control of an apparatus, in particular, an apparatus for performing manufacturing operations on a work piece. The system has a hierarchical series of functional operations which are grouped to provide control of the apparatus, in particular a methodology for easy modification of tool control functions.

BACKGROUND OF THE INVENTION

Historically, software control of manufacturing equipment has been relatively simple and straightforward. Today, however, as manufacturing equipment becomes more costly with tighter process tolerances, the software has become substantially more complex. This is further complicated by growing trend towards "cluster tools" in which more than one process station is incorporated into a single "tool", where all of the detailed control segments of which station fall under the control of one high level algorithm, which for example controls a robot taking parts from one or more input stations and delivering them to one or more process stations in a predetermined order, finally delivering the part to an output station (which may in fact also be the input station, essentially returning the processed part to the same place it was taken).

This code can include complex scheduling code to determine which process station should be served next by the robot in addition to the detailed control code required by the robot and each station to function. In a standard application, this can result in tens to hundreds of thousands of lines of code, of which some must run quickly, while other parts are less speed critical. For example, the overall scheduling part of the code must run quickly to determine which operations should be undertaken next, while considering which current operations are near completion and which operations are throughput limiting, to ensure that the tool is running at peak efficiency for the maximum time.

These speed requirements for part of the code typically result in all of the code being compiled for maximum efficiency and result in very long and complex control programs. The greatest difficulties with the current situation arises if the sequence needs to be modified, or a single component needs to be upgraded and is not compatible with either the existing sequence or the control codes are not compatible. The result in either of these situations is the need to examine the control code, modify the appropriate parts, recompile, reinstall and requalify the code on the tool, requiring an experienced programmer who (i) understands the software language; (ii) understands the modifications to be made to the tool sequence; (iii) understands the specific hardware calls to each station and for each operation; (iv) understands the tool requirements and (v) is aware of "bugs" in the tool hardware and software. To fulfill these requirements, a programmer must have substantial experience with the tool, usually gained over an extended period of time. In addition, whenever a change is required, the programmer must understand the change and detailed process characteristics, become reacquainted with the software and find and understand those parts of the code that need modification.

What would be useful and is not available, is a tool control code which could be relatively easily modified by a tool maintenance engineer of station owner without the specialized aid of other professionals, including programmers.

OBJECTS

It is an object of the present invention to provide an improved system for control of an apparatus.

It is another object of the present invention to provide a system which can be modified without requiring source code revision.

It is another object of the present invention to provide an improved system which provides for modification of the system function by selection of options.

It is another object of the present invention to provide a system which is modified by selecting options from a set of menus on a display screen.

SUMMARY OF THE INVENTION

A broad aspect of the present invention is a system and method for control of an apparatus. The system has a hierarchical series of levels of functional operations. The hierarchical series has a highest level and a series of lower levels. There is a means for initiating an instruction in the highest level which results in execution of instructions in the series of lower levels until an instruction is executed to control the apparatus.

In a more specific aspect of the systems and methods according to the present invention, a functional operator of a level corresponds to a grouping of functional operators of a lower level.

In another more specific aspect of the systems and methods according to the present invention, each level of the hierarchy of levels is in a sequential order wherein a higher level contains groups of functional operations of the next succeeding lower level.

In another more specific aspect of the systems and methods according to the present invention, a process of the system and method for control of the apparatus is specified by selection of groups of functional operations at each level without requiring recoding of the system and method, or recompilation of the modified system and method.

In another more specific aspect of the apparatus and method according to the present invention, group of functional operations for each level are selected from a menu or series displayed on a display device.

BRIEF DESCRIPTION OF THE DRAWINGS

Further objects, features, and advantages of the present invention will become apparent from a consideration of the following detailed description of the invention when read in conjunction with the drawings in which.

Level N-1 has Q functional operations $F^{N-1}$, i=1 to Q

Level N has R functional operations $F^N$, i=1 to R.

Each functional operation $F^1$ of Level 1 includes a group of $F^2$ of the functional operations of Level 2, wherein j is a set of values selected from 1 to Q, each of which can occur more than once.

Each functional operation $F^{(N-1)}$ of Level n-1 includes a group wherein J is a set of values selected from 1 to R, each of which can occur more than once. If level N corresponds to the lowest level, then each $F^N$ corresponds to an operation interacting with the apparatus being controlled. Any of the levels 1 to N can have a functional operation which operates directly on the apparatus being controlled.

Figure 2:
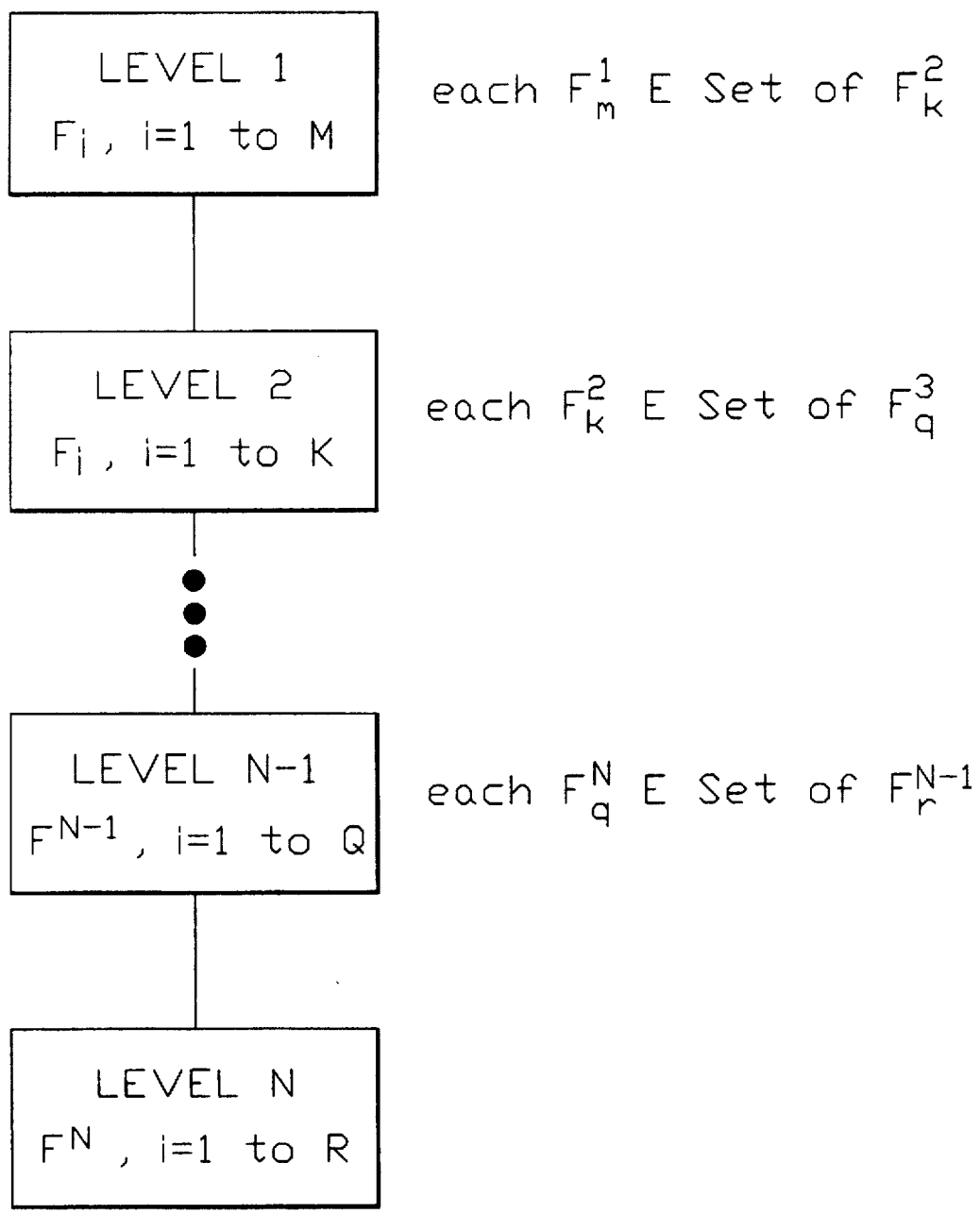
FIG. 2 schematically shows an N level system according to the present invention which is applicable to any operation which is being controlled. Level 1 has M functional operations. $F_i$, i=1 to M. Level 2 has K functional operations $F_i$, i=1 to K.
Figure 3:
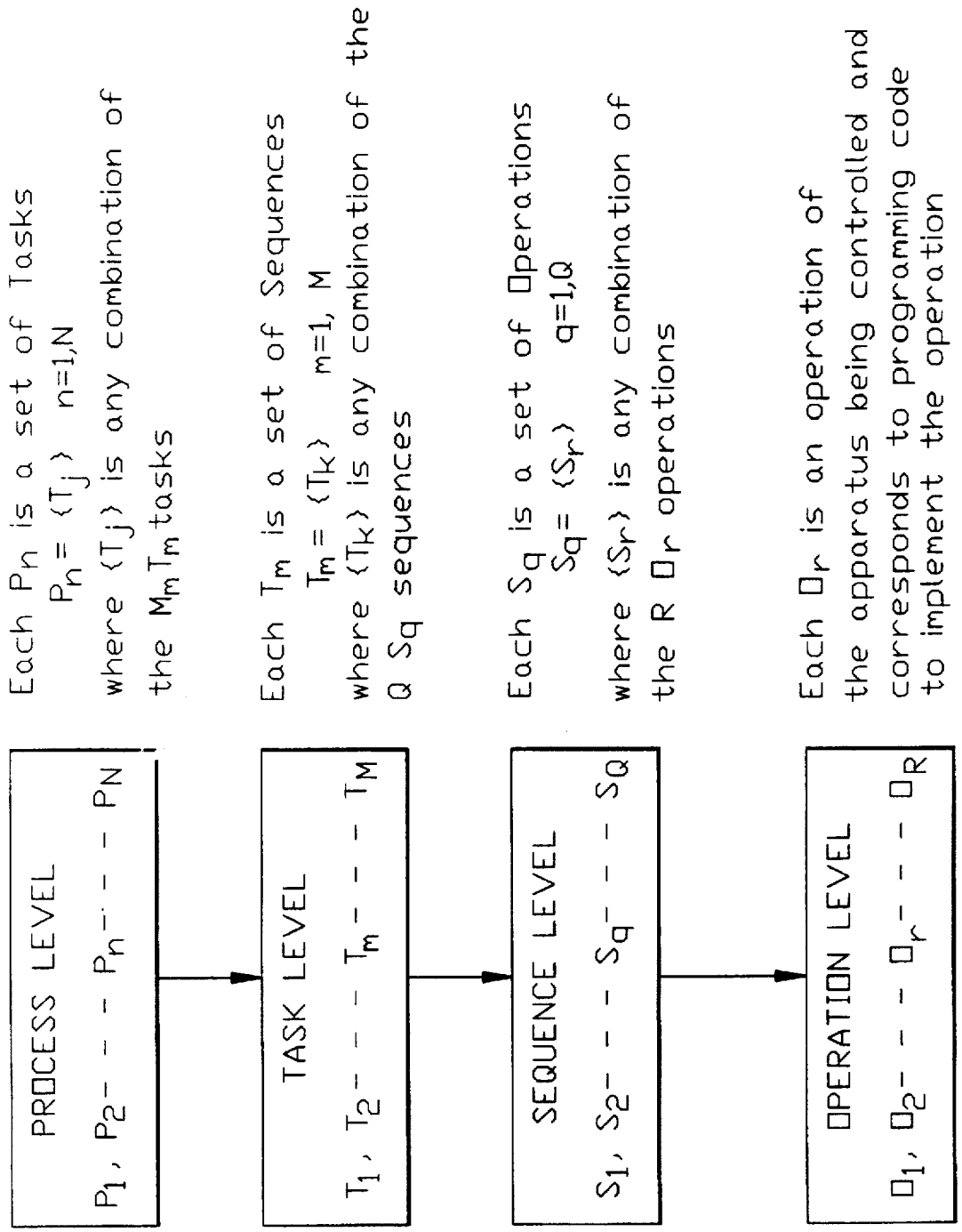

FIG. 3 is an example of a specific embodiment of the system schematically shown in FIG. 2. The embodiment of FIG. 3 has four levels: a process level, a task level, a sequence level and an operation level, each of which will be defined in detail below. Similarly to FIG. 2, each $P_i$ for i=1 to N, is a process wherein each $P_i$ contains a group of tasks [$T^q$] which is any combination of the set of M tasks $T^m$ where m=1 to M from the Task Level. Each Task $T^m$ contains a group of sequences [Sq] which is any combination of the set of Q sequences Sq where q=1 to Q. Each sequence Sq contains a group of operations [$O^r$] where r=1 to R from the Operation Level. Any of the process, task and sequence level can have a functional operation which operates directly on the apparatus under control.

Figure 4:
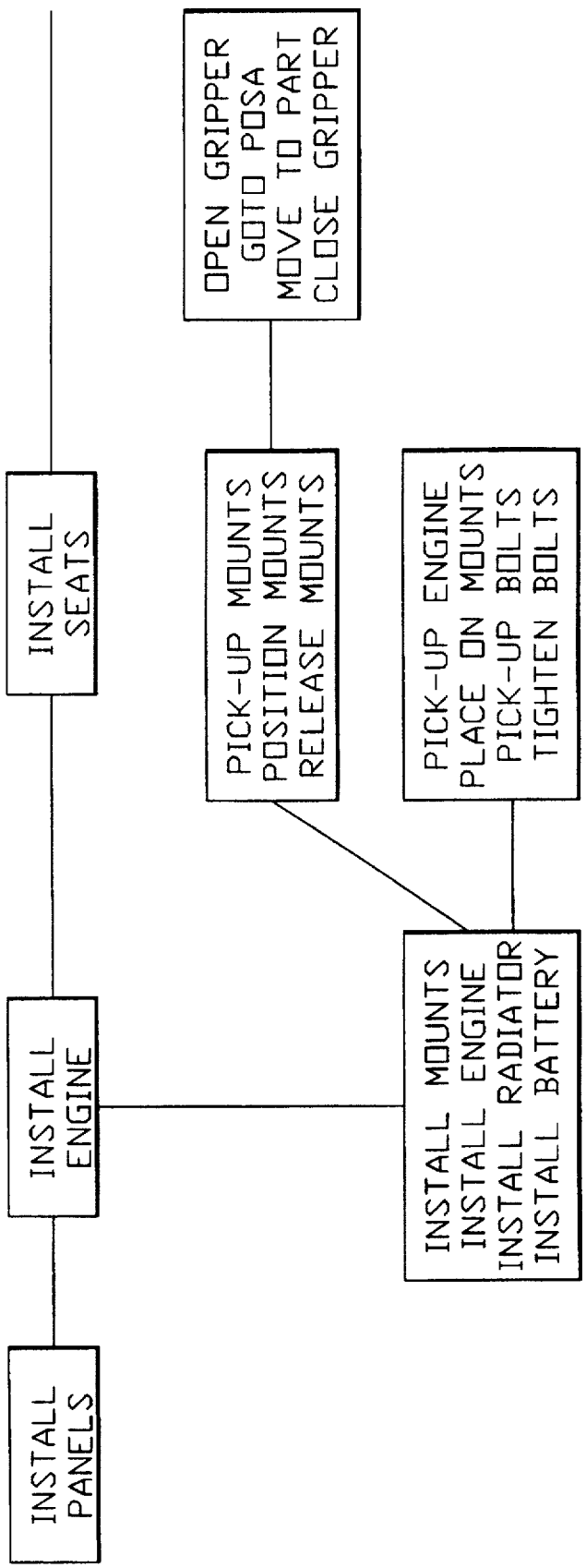

FIG. 4 shows a specific example of the generic system shown in FIG. 3.

DETAILED DESCRIPTION OF THE INVENTION

To overcome these shortcomings, we have invented a simple-language, hierarchical structure of lists of commands which are read, interpreted and executed to control the operation of a tool.

A manufacturing process occurs within a cell, a self-contained entity that has an input station, an output station and at least one station where a part undergoes some transformation. Although the invention will be described with reference to an embodiment directed to a manufacturing operation, it is not limited thereto. The operation being controlled, can be any operation having a group of subparts which must be scheduled into a sequence to satisfy a particular end objective, such as a securities operation, an inventory control operation, etc.

Using a hierarchy that we have invented consisting of PROCESS's, TASK's, SEQUENCE's and OPERATION's, all written as simple language files which are fully editable and modifiable by the users, the operations of a manufacturing cell are controlled, including the steps to take when process exceptions occur. Due to the way in which this invention is implemented, it enables on-line tool diagnostics and simulations that can predict the effects of proposed process changes, thereby reducing the time normally required to make alterations to a process.

Figure 1:
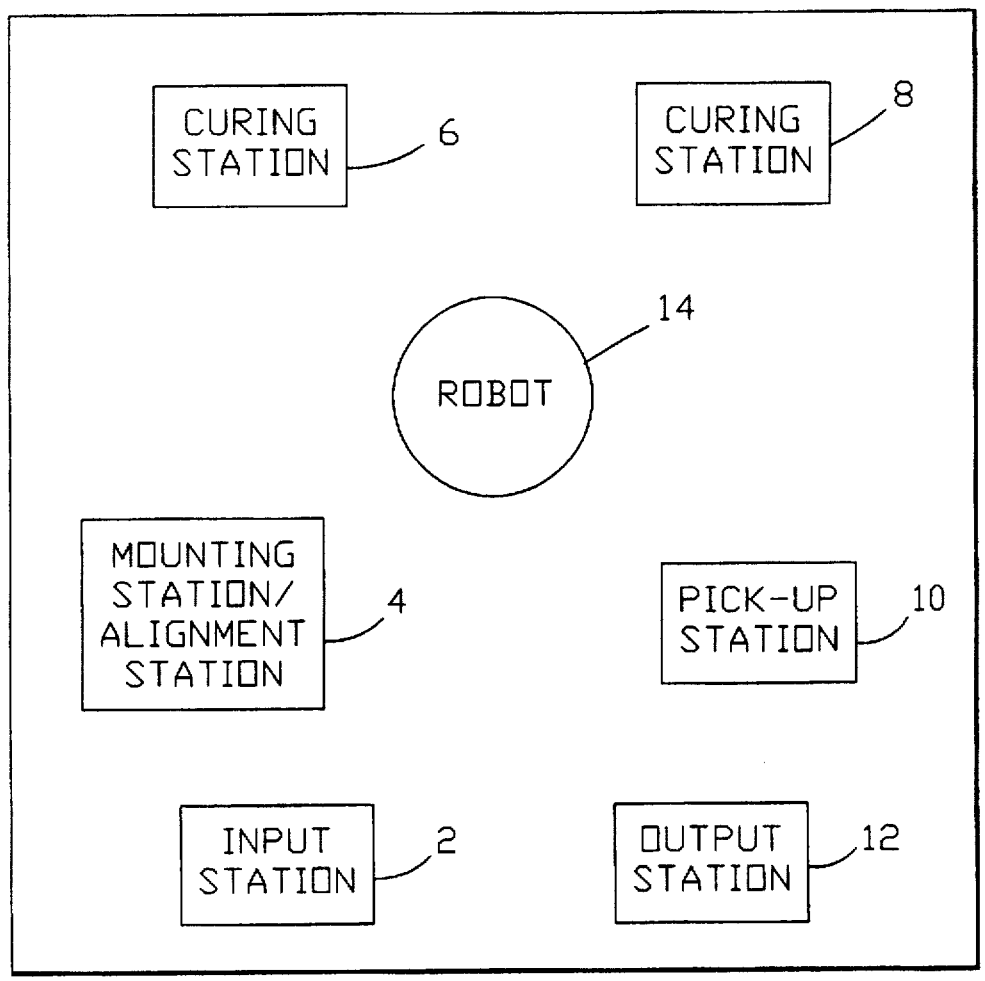
FIG. 1 schematically shows an embodiment of an apparatus which is controlled by the system and method according to the present invention.

For the purposes of this Invention, the definition of a cell is shown in FIG. 1 and includes an input station 2, a mounting station/alignment station 4, curing stations 6 and 8, a pick-up station 10, an output station 12 and a robot 14, which is responsible for all movement of parts. There may be multiple positions at some of these stations, eg. two input trays for parts coming into the cell (cluster tool).

A cell also possesses a transport mechanism that moves parts between stations. All of these are resources, which can be allocated and freed. A cell has a controller, software that coordinates the cell's activities.

A hierarchical list of detailed process steps has been invented, defined as:

| | |
|---|---|
| Operation | The lowest level command issued by the cell controller. Operations are station or device specific. Examples include but are not limited to transport mechanism commands, all commands transmitted to the stations and sensor I/O operations. These commands are typically written specifically for the device to be controlled in "machine language" understood by that tool. Although the lowest level understood by the cell controller, if the Operation in question is a command to a station, the actions, performed by the receiving station may be quite complex. The model is not affected by the stations' intelligence. An example of this would be to initiate a complex process profile, which itself is controlled by a PC acting as a tool controller. |
| Sequence | A series of one or more Operations. Each resource type should have a corresponding Sequence type. There are three kinds of sequences: |
| Transport | This takes the transport mechanism from one defined point to another. The transport mechanism may or may not be transporting a part. |
| Process | This accomplishes a change in a part's state. |
| Input/ Output | For input, this brings a part to a point where it can be presented to the transport mechanism. For output, this prepares the output station to receive a part. |
| Task | A series of one or more Sequences, which do not have to be the same kinds of sequences. A task "seizes" a resource. A particular resource will sometimes have to go through several sequences before it can be freed for other work, hence the Task level. How many Sequences to assign to a particular Task is an implementation issue, and all that the model and experience suggest is that a resource never be seized for any longer than is necessary. During normal operation, a Task is uninterruptible, a condition which follows from the fact that a Task seizes a resource. |
| Process | A series of one or more Tasks that accomplish a cell goal. Cell goals include cell initialization, reset and runout, and part transformation. |

The main advantages of this invention are that

Users are able to ignore the software that drives their manufacturing tools, properly concerning themselves only with the tool itself.

The users are free to modify what the tool does without a programmer's assistance.

The level of expertise necessary to change the operation of the tool depends on the type of modifications necessary and doesn't require highly trained personnel to make routine adjustments.

Neither the design nor the model are wed to any particular environment. For example, the system could be implemented using Cellworks, a cell control software package developed and marketed by Fastech Integration.

The cell is run by the scheduling program reading the process file, which is a series of task names, similar to that above, written in simple language, an example of which is shown in Table 1 and which will appear in an editor in a form which is as readable as that shown in TABLE 1.

The first entry in that file, corresponding to the TASK, "Cure$_{13}$ a$_{13}$ Part" in TABLE 1, is then executed by reading the file "Cure_a_part.TSK which can contain one or more SEQUENCES names as shown in TABLE 2. The SEQUENCE file for the first entry, is then opened (Table 3) and the OPERATIONs in that file are then executed, as shown in Table 4. It is important to note that ONLY the execution of an OPERATION results in a change in the status of the CELL by moving the robot, initiating a curing sequence, etc.

After the OPERATION is completed, the next OPERATION in the SEQUENCE is read and executed. When all of the OPERATIONS in the SEQUENCE file have been completed, the next SEQUENCE in the TASK file is then read, and so on. It is important to note that a SEQUENCE can consist of only one OPERATION, a TASK of only one SEQUENCE and a PROCESS of only one TASK.

The hierarchical nature of these files means that changes can be made to the order in which lower level files are read and acted on, without modification of those files, or knowledge of how those files work. For example, the order in which stations receive a part can easily be changed simply by changing the order of the TASK's in the relevant PROCESS file. No knowledge or modification of the SEQUENCE's or OPERATION's involved is necessary. In a conventional tool-control application, a change of this magnitude could require extensive changes to the compiled code by an experienced programmer.

It is also important to note that this hierarchical structure separates the equipment-specific codes and controls from the main body of the program and allows quick and simple editing. Thus, if a robot should be updated with a more advanced version, the only files to be modified are those SEQUENCE's that contain robot operations.

There is an inherent capability to pass parameters from TASK's, and SEQUENCE's to the OPERATION by allowing variables in the OPERATION's. For example, this results in only one SEQUENCE list which is read to service both process stations. This is accomplished, by passing the station number to be serviced as a <variable> from the TASK. This results in only one file which needs to be modified in case changes are required to both stations. If the stations become substantially different, requiring very different OPERATIONS, the process stations are defined with separate SEQUENCES.

A second model of a cell would be an assembly point in a manufacturing line for the manufacture of a complex object. In this case, a partially assembled object is delivered to the input station, a robot adds a series of subassemblies to the object and it is delivered to the output station for transport to the next assembly point. The hierarchical approach described in this patent can be used to control the activities of each assembly point in addition to the control of objects to various assembly stations. An example of the hierarchical order is shown in FIG. 4 which could apply to an automotive plant assembly process sequence.

For different objects, the order in which the subassemblies are added to the structure may be desirable to be changed. By altering the order in the hierarchical system described, the process is simple and inexpensive to modify.

PREFERRED EMBODIMENT

Handlers

The preferred embodiment of this invention is implemented in four handlers, each dealing with only one layer of the hierarchy. It is important to point out that:

There is no logic imbedded in any of the files handled by the layers of the hierarchy.

The handlers themselves are concerned only with whether or not the last action initiated completed successfully. Exceptions to normal processing are handled by the exception handler, described below, while normal processing is handled by the scheduler, also described below.

All operations are ASCII strings, fully editable and modifiable by the users. Sequences are simply lists of these strings, and sequence names are simply file names, as are task and process names.

Each operation has a field that specifies what string signifies a successful operation, and the operations handler will look for that when a completion message is received from the device handler. If the return code is good, the operations handler signals the sequence handler that the operation has completed successfully. If it has not, the exception handler is apprised of this fact. If the exception handler determines that recovery is not possible, it notifies the operations handler of that fact, and the operations handler in turn informs the sequence handler. If recovery can be attempted—for example, a timeout for a sensor reading might be increased on the fly—and is successful—then events proceed normally.

Graphical Interface

To enable this invention to be more user-friendly a graphical interface is implemented that allows the user to control the tool in a natural and comfortable way.

All OPERATION's, SEQUENCE's, TASK's and PROCESS's are under the user's control and can be added, edited and deleted as the user chooses. For example, when the user wants to add another operation to an existing sequence, a list of existing sequences will be displayed. After the sequence is chosen and displayed, the user will be able to display a list of available operations, and choose the operation desired. If the operation is not yet available, the user can add an operation to a list of available operations. The same holds true for each of the subsequent levels in the hierarchy.

If a device that is the target of an operation has its own operation set, the format of the operation is likely to be cryptic. For example, the command to start a process cycle may contain a large number of parameters which define the process cycle to be undertaken for that part or set of parts. This command could be 2 or more lines long due to these parameters. These operations will be presented to the user in a readable, understandable format. In an additional example, assume that a robot operation consists of a two-letter representation followed by some optional character string. As presented to the user, the two-letter representation will be expanded into a meaningful string, and the data string will be presented as individual, labelled fields. Then, when the user saves the work, one of two paths can be followed:

The individual operations can be compressed into their device-readable format when the file is saved. Obviously, this means that anytime the file is selected for editing, it will have to be "uncompressed" for the user.

The individual operations can be compressed into their device-readable formats just before they are transmitted to the target device.

Users will also be able to easily modify parameters required for the system to perform. For example, the users will be able to specify addresses for target devices and associate the physical address with a symbolic one. Then, if the physical address changes, all the user has to do is to edit the file and change the physical address. The software, which looks for the symbolic address, and then uses the equivalent physical address, will not have to be changed.

Scheduling

Because multiple processes can be executing simultaneously, the system requires a flexible scheduler, the function of which is to allocate cell resources so as to maximize tool throughput: it will work in conjunction with the process handler. The reader will recall that a PROCESS consists of one or more TASK's, and that a TASK seizes a resource. When the process handler retrieves a TASK from the process file, it will pass that TASK name to the scheduler.

The scheduler will know what resource is required for that TASK, and will either seize it immediately for that TASK or, if the resource is already seized, will wait until that resource is made available. It will then tell the process handler to initiate that TASK.

When the process handler learns that a TASK has completed, it will convey that information to the scheduler, which will then free the seized resource associated with that TASK and, if another TASK is waiting on that resource, seize it and tell the process handler that the waiting TASK can now be initiated.

Exception Handling

An important part of the preferred embodiment is the way in which the software handles errors or unexpected situations which arise during the operation of the tool. For example, a part is dropped during transport or a part is not present at the input station when expected (i.e. there are only 19 parts in a 20 part cassette or parts are not in consecutive slots).

The exception handler will handle all non-normal events in the system. It will have available to it a list of all exception messages, and each exception message will be associated with a recovery process.

The exception handler will also log all exception events, and this information will be used by the diagnostic system, described below.

Diagnostic System

The diagnostic system will have two main features:

Exception review
The diagnostic system will have access to the exception logs maintained by the exception handler, and can be used to generate exception reports for review by tool users.

In conjunction with a case-based expert system—with cases built up over time as experience with the tool increases—these same exception logs will be used to analyze exception events and provide diagnostic and preventive maintenance advice to the tool users.

On-line event logging
An on-line event logger will be available to tool users. We expect this to have two major uses:

1. Users will be able to make notes about logged exceptions that they are investigating. This way, everyone working on the same problem has access to all the work done up to that point.
2. Because the exception handler will not see every possible exception event, the on-line logger will allow users to make note of these events, and also to make note of any circumstances associated with the event.

Simulation System

The simulation system will allow users to predict the results of tool changes. Using system files that contain records of times associated with all operations, sequences, and tasks, the module will be able to accurately predict the effects of such changes as the addition of new operations to existing sequences, different task priority schemes, and changes in transport mechanism.

Table 1.

PROCESS List

Cure_a_Part
Tool_Reset
Tool_Runout

Table 2.

TASK LIST for "CURE_A_PART"

Robot_Home to CoRex
Transport collar from Collar-Cooling Station to Pickup_Stand
PuRex to IRex
Transport part from Input Station to Pickup_Stand
Mate collar to part
Transport part from Pickup_Stand to Curing Station
Initiate cure
CuRex to CoRex
Transport collar from Collar-Cooling Station to Pickup_Stand
PuRex to IRex
Transport part from Input Station to Pickup_Stand
Mate collar to part
Transport part from Pickup_Stand to Curing Station
Initiate cure Table 3.

SEQUENCE list for "Transport Collar from Collar Station to Pickup Stand"

Robot_home to CoREX
Retrieve collar from Collar-Cooling Station
CoRex to Purex
Place collar on Pickup_Stand

TABLE 4

| Retrieve Collar From Collar Cooling Station | |
|---|---|
| Codes | Remarks |
| WS00 (wafer status) | part status (robot empty) |
| MOC | move to location C |
| WM | wait until movement complete |
| GOC01 | get item from slot 01 at location C |
| WM | wait until movement complete |
| WS01 | part status (robot loaded) |
| MOB | move to location B |
| WM | wait until complete |
| POB01 | put part at slot 01 of location B |
| WS00 | completed successfully |

What is claimed is:

1. A system for control of an apparatus for operating on a work piece comprising:
   a hierarchial series of levels of functional operations;
   said hierarchial series has a highest level and a series of lower levels;
   means for initiating an instruction in said highest level which results in execution of instructions in said series of lower levels until an instruction is executed to control said apparatus;
   an input location for said work piece;
   an output location for said work piece; and
   an operating location where said work piece is operated on by said apparatus.

2. A system according to claim 1, wherein at least one of said highest level and said series of lower levels comprises:
   a 1st level to an Nth level, wherein N>1 and wherein each of which comprises at least one of said functional operations;
   said Nth level comprises at least one Nth level functional operation;
   an (N-1) level comprises at least one group of said at least one Nth level functional operation.

3. A system according to claim 1, wherein at least one of said highest level and said series of lower levels comprises:
   a 1st level to an Nth level wherein N>1 and wherein each of which comprises a plurality of said functional operations;
   said Nth level comprises a plurality of Nth level functional operations;
   an (N-1)the level comprises a plurality of groups at said Nth level functional operations.

4. A system according to claim 1, wherein there are four of said levels comprising:
   a process level comprising a plurality of processes each of which comprises a group of tasks;
   a task level comprising a plurality of tasks each of which comprises a group of sequences;
   a sequence level comprising a plurality of sequences each of which comprises a group of operations;
   an operation level comprising a plurality of operations each of which comprises at least one instruction executable to control said apparatus.

5. A system according to claim 1, wherein said apparatus operates on a work piece.

6. A system according to claim 5, wherein said apparatus further includes an input location for said work piece;
   an output location for said work piece; and
   an operating location where said work piece is operated on by said apparatus.

7. A system according to claim 6, further including means for mounting and alignment of said work piece; means for processing said work piece, and a means for moving said work piece between locations in said apparatus.

8. A system according to claim 5, further including a means which allows changes in at least one of said highest level and said series of lower levels of said series to be tested without risking damage to said apparatus or a work piece on which said apparatus operates.

9. A system according to claim 1, further including a scheduler which defines the order in which competing resources are allocated.

10. A system according to claim 1, further including a means in which an editor, built into a software control package interprets a set of instructions and reads and executes a corresponding file.

11. A system according to claim 1, wherein said system is a controller for operations within said apparatus.

12. A system according to claim 1, further including a means to handle error or exception conditions for said apparatus.

13. A system according to claim 12, further including a means to handle error or exception conditions for a manufacturing tool.

14. A system according to claim 12, further including a means in which an editor, built into a software control package interprets a set of simple instructions and reads and executes a corresponding file.

15. A system according to claim 12, further including a means which allows changes in said hierarchical series of simple language files to be tested without risking damage to a manufacturing tool or parts on which said manufacturing tool operates.

16. A system according to claim 12, further including a scheduler which defines the order in which competing resources are allocated.

17. A system according to claim 1, wherein said hierarchical series of levels has a plurality of groups of said functional operations over said series of levels.

18. A system according to claim 17, further including means for modifying which of said functional operations correspond to each of said plurality of said groups.

19. A system according to claim 18, wherein said system operates on a computer and wherein said means for modifying is an input/output device to said computer.

20. A system comprising:
   A hierarchical series of simple language files to provide control of the operation of a manufacturing tool, wherein an instruction from the highest level file results in a multiplicity of instructions to be read and executed from the next lower level of the hierarchy and so on, until instructions which are directly compatible with specific hardware elements are executed.

21. A system for control of an apparatus which operates on a work piece comprising:
   a hierarchial series of levels of functional operations;
   said hierarchial series has a highest level and a series of lower levels;
   means for initiating an instruction in said highest level which results in execution of instructions in said series of lower levels until an instruction is executed to control said apparatus;
   said hierarchical series of levels comprises a first level to an Nth level, wherein n>1 and wherein each of which comprises at least one of said functional operations; said Nth level comprises at least one Nth level functional operation; an (N-1) level comprises at least one group of said at least one Nth level functional operation;
   an output location for said work piece;
   an operating location where said work piece is operated on by said apparatus;
   means for mounting and alignment of said work piece;
   means for processing said work piece, and a means for moving said work piece between locations in said apparatus.

22. A system comprising:
   a hierarchical series of simple language files to provide control of the operation of a manufacturing tool, wherein an instruction front he highest level file results in a multiplicity of instructions to be read and executed from the next lower level of the hierarchy and so on, until instructions which are directly compatible with specific hardware elements are executed;
   a means to handle error or exception conditions for said tool;
   a means in which an editor, built into the software control package interprets a set of instructions and reads an executes a corresponding file;
   a means which allows changes in said hierarchical series of simple language files to be tested without risking damage to said manufacturing tool or parts on which said manufacturing tool operates;
   a scheduler which defines the order in which competing resources are allocated.

* * * * *